Aug. 25, 1925.　　　　　J. L. MOORE　　　　　1,550,707
STOVE
Filed Feb. 13, 1923　　　2 Sheets-Sheet 1
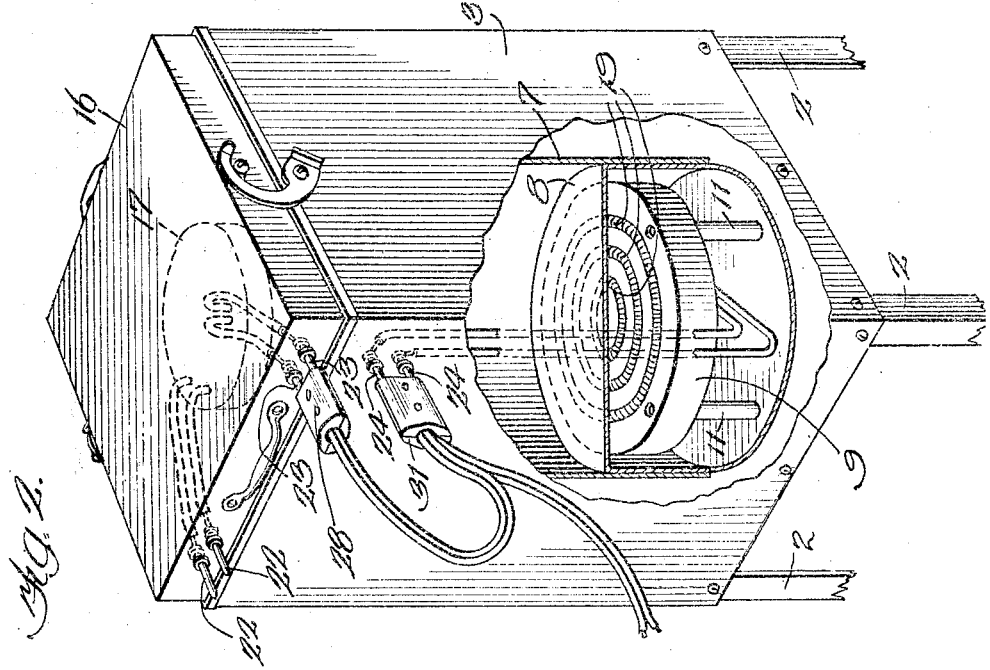
Inventor:
Jacob L. Moore Aug. 25, 1925.
J. L. MOORE
STOVE
Filed Feb. 13, 1923    2 Sheets-Sheet 2
1,550,707
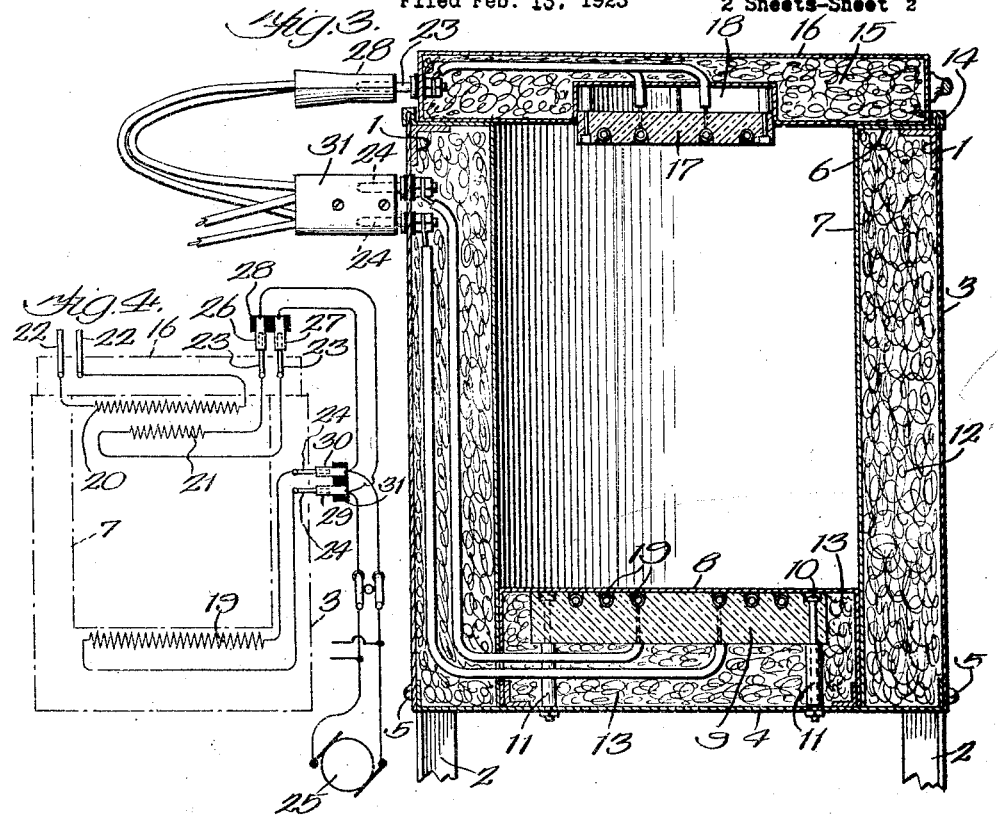
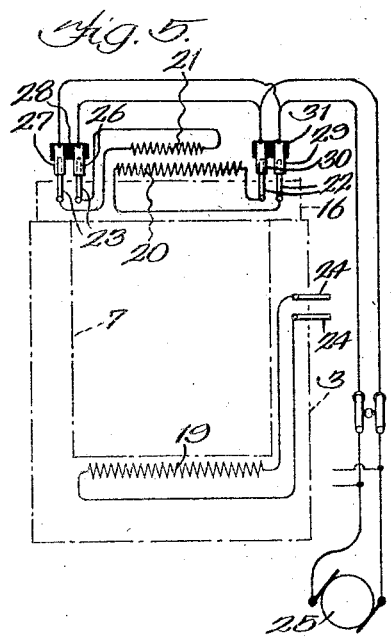
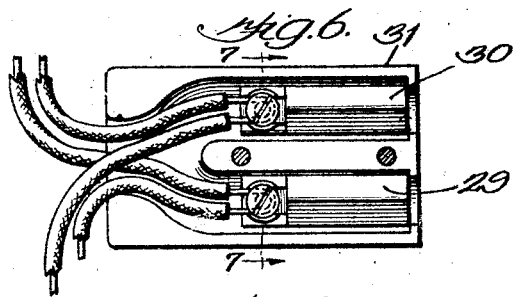
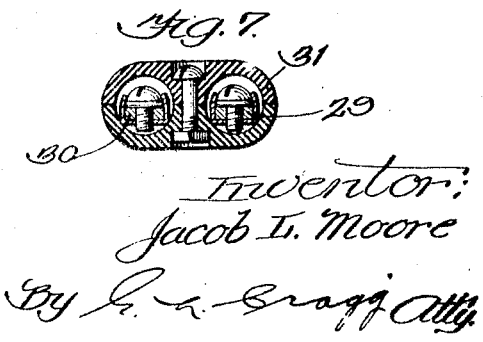
Inventor:
Jacob L. Moore
By G. L. Gragg Atty Patented Aug. 25, 1925.

1,550,707

UNITED STATES PATENT OFFICE.

JACOB L. MOORE, OF MUNCIE, INDIANA.

STOVE.

Application filed February 13, 1923. Serial No. 618,768.

*To all whom it may concern:*

Be it known that I, JACOB L. MOORE, a citizen of the United States, residing at Muncie, in the county of Delaware and State of Indiana, have invented a certain new and useful Improvement in Stoves, of which the following is a full, clear, concise, and exact description.

My invention relates to stoves of a class known as fireless cookers and resides in the provision of a hot plate which may be employed either as an element of the cooker or alone in its individual capacity.

As my invention is preferably embodied, the hot plate is mounted upon the lid of the stove and this lid is adjustable to enable the hot plate to be placed uppermost when it is to be used alone as a hot plate or to be lowermost to contribute to the heating of the well of the cooker.

The cooker and hot plate are electrically heated. In order that such a cooker may be constituted a lamp socket device there are two windings for the hot plate both being connected in parallel when the hot plate is uppermost to function as such and only one of which is in circuit when the hot plate is lowermost to contribute to the heating of the cooker well, this hot plate winding and the winding at the bottom of the well then being in parallel. I do not wish to be limited to this arrangement of the windings, however, inasmuch as it is obvious that the windings of the hot plate may be employed to furnish all of the heat to the cooker well.

The invention will be more fully explained by reference to the accompanying drawings in which Fig. 1 is a perspective view of a fireless cooker constructed in accordance with the preferred embodiment of the invention, the lid of the cooker being adjusted to place the hot plate uppermost; Fig. 2 is a view of the same cooker, with parts broken away, to illustrate the portion of the well and the heating winding beneath the same and also showing the lid reversed to place the hot plate lowermost and in register with the well; Fig. 3 is a vertical sectional view of the cooker; Fig. 4 is a diagram illustrating the preferred circuit arrangement which obtains when the hot plate is lowermost as illustrated in Fig. 2; Fig. 5 is a diagram illustrating the circuit arrangement which obtains when the hot plate is uppermost as illustrated in Fig. 1; Fig. 6 shows one-half of one of the plug structures and the wires leading thereto that connect the windings of the cooker in circuit as desired; and Fig. 7 is a sectional view on line 7—7 of Fig. 6.

Like parts are indicated by similar characters of reference throughout the different figures.

The structure illustrated includes a top framework 1 for the body portion of the cooker and four legs 2 preferably secured at their upper ends to this framework as disclosed in the patent to James H. Reichart, 1,415,049, dated May 9, 1922.

The exterior walls 3 of the casing may be formed of sheet metal secured to the frame and to the legs and enclosing these parts. The bottom wall 4 of the cooker, also desirably of sheet metal, is removably secured to the side walls 3 by screws 5. A large circular opening is formed in the top wall 6. The well 7 continues downwardly from this opening to the bottom 4 of the cooker. The bottom 8 of the well is located a considerable distance above the bottom of the cylindrical wall of the well in order to afford room for a heating unit 9 that is desirably located beneath the well bottom 8 and which is assembled with the cooker bottom 4 by means of bolts 10 and which is maintained in close proximity to the well bottom 8 and in spaced apart relation with the cooker bottom 4 by means of the distance preserver sleeves 11 which surround the bolts 10 and are interposed between the heating unit 9 and the cooker bottom 4. Suitable heat insulating material, such as asbestos, is interposed between the cylindrical and upright wall of the well and the side walls of the cooker as indicated at 12. Other heat insulating material is interposed between the heating unit 9 and the cooker bottom 4 and also surrounds the heating unit as indicated at 13.

The top of the body of the cooker is formed with a rim 14 at the outer edge of the cooker to form a seat in which the lid 15 of the cooker may be received. This cooker lid is hollow, being made of sheet metal as indicated at 16. The interior of the lid is filled with asbestos or other suitable heat insulating material as shown.

A heating unit 17 is carried by the lid in alignment with the well of the cooker, this heating unit being desirably partially received within a correspondingly shaped recess 18 formed in one of the broad faces of the cooker lid. The lid is preferably unattached to the body of the cooker so that it may be placed with the heating unit 7 either within the cooker, as illustrated in Figs. 2, 3, and 4, or outside of the cooker, as illustrated in Figs. 1 and 5. The heating unit 17 desirably projects beyond the plane of the lid so as to project within the well when the heating unit 17 is lowermost and so as to project above the lid to serve as a hot plate when this heating unit is uppermost.

As I have embodied the invention there is but one winding 19 for the heating unit 9 at the bottom of the well and there are two windings 20 and 21 for the heating unit 17. When the heating unit 17 is uppermost to serve as a hot plate, the windings thereof are desirably connected in parallel at which time the winding 19 is desirably excluded from circuit so as not to over load the lamp socket. When the heating unit 17 is lowermost to take part in heating the cooker, one of the windings thereof is excluded from circuit and the remaining winding thereof is brought into parallel with the winding 19 at the bottom of the well.

In the preferred embodiment of the invention the winding 20 is equipped with terminals 22 that are carried upon and project laterally from the lid. The winding 21 is similarly provided with terminals 23 that are also carried upon and project laterally from the lid. The winding 19 at the bottom of the well is provided with terminals 24 which are carried upon and project laterally from the body of the cooker.

In Figs. 4 and 5 I have illustrated any suitable source of current 25 which may be the generator of a commercial lighting system. There are two connectors connected with the generator as illustrated in Figs. 4 and 5. One of these connectors includes two terminal sleeves 26, 27 which are mechanically assembled by a body of insulation 28. The other of these connectors also includes two terminals sleeves 29 and 30 which are assembled by a body of insulation 31. These connectors may be of the usual mechanical construction, as illustrated in Figs. 6 and 7, the insulating body thereof being in two parts as illustrated to permit of the assembly of the circuit wires with the connecting sleeves. The wiring illustrated is such that the sleeves 26 and 29 are in parallel as are the sleeves 27 and 30. When the lid is disposed to bring the heating element 17 uppermost to enable this heating element to be used as a hot plate both connectors are disposed as illustrated in Figs. 1 and 5, whereby the two windings 20 and 21 of the hot plate are included in circuit in parallel relation. When the lid is disposed to bring the heating element 17 lowermost to enable this heating element to be used as a component part of the fireless cooker one of the connectors serves to connect one of the windings, 21, of the heating unit 17 in circuit and the other connector serves to connect the winding 19 at the bottom of the well parallel with the retained winding of the heating unit 17.

While the heating unit 17 of the cooker is desirably supported upon the body of the stove through the intermediation of the lid when such heating unit is adjusted to function as a hot plate, I do not wish to be limited to such a disposition thereof as I believe it to be broadly new with me to employ a heating unit which may be disposed in a horizontal position upon the exterior of the cooker to function as a hot plate or to be located within the cooker to function as a heating unit for the well thereof.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. A fireless cooker formed with a well and having a heating plate provided with an electrical resistance heating unit and adjustable to be upon the interior of the cooker to heat the well and to a horizontal and reversed position upon the exterior of and in assembly with the well to serve as a hot plate.

2. A fireless cooker having a body portion formed with a well; a heating plate provided with an electrical resistance heating unit; a removable lid for closing the well and carrying said plate upon one of its horizontal sides, said body portion being formed to support said lid in one position above the well with said plate within the cooker to heat the well and in a reverse position above and in assembly with the well with said plate uppermost and horizontal to serve as a hot plate.

3. A fireless cooker having a body portion formed with a well; a heating plate provided with an electrical resistance heating unit; and a removable lid for closing the well and carrying said plate upon one of its horizontal sides, said body portion being formed to support said lid in one position above the well with said plate within the cooker to heat the well and in a reverse position in assembly with the well and with said plate uppermost and horizontal to serve as a hot plate.

4. A fireless cooker having a body portion formed with a well; a lid for covering the well; and a heating plate provided with an electrical resistance heating unit and carried upon the lid and positioned to be locatable within the cooker when the lid is in one adjustment, said lid being also adjustable to a position with the plate in assembly with the well and uppermost and horizontal to enable said plate to serve as a hot plate.

5. An electric fireless cooker formed with a well provided with a heating winding and having a heating plate also provided with a heating winding and adjustable to be upon the interior of the cooker to heat the well and to a horizontal position upon the exterior of and in assembly with the well to serve as a hot plate; and circuit connecting means for bringing both of said windings into circuit when said plate is in either of its adjustments.

6. An electric fireless cooker having a body portion formed with a well having a heating winding; a heating plate also provided with a heating winding; a removable lid for closing the well and carrying said plate upon one of its horizontal sides, said body portion being formed to support said lid in one position above the well with said plate within the cooker to heat the well and in a reverse position above and in assembly with the well with said plate uppermost and horizontal to serve as a hot plate; and circuit connecting means for bringing both of said windings into circuit when said plate is in either of its adjustments.

7. An electric fireless cooker having a body portion formed with a well having a heating winding; a heating plate also provided with a heating winding; a removable lid for closing the well and carrying said plate upon one of its horizontal sides, said body portion being formed to support said lid in one position above the well with said plate within the cooker to heat the well and in reverse position in assembly with the well and with said plate uppermost and horizontal to serve as a hot plate; and circuit connecting means for bringing both of said windings into circuit when said plate is in either of its adjustments.

8. An electric fireless cooker having a body portion formed with a well having a heating winding; a lid for covering the well; a heating plate also provided with a heating winding and carried upon the lid and positioned to be locatable within the cooker when the lid is in one adjustment, said lid being also adjustable to a position in assembly with the well and with the plate uppermost and horizontal to enable said plate to serve as a hot plate; and circuit connecting means for bringing both of said windings into circuit when said plate is in either of its adjustments.

9. In an electric cooker, in combination, a casing having a well and a cover for said casing adapted to overlie said well, and a heating plate carried by one face of said cover adapted to register with said well, said cover being reversible whereby said heating plate can be turned upwardly while still covering said well.

10. In an electric cooker, in combination, a casing having a well and a cover for said casing adapted to overlie said well, characterized by said cover being reversible and having a heating plate at one side adapted either to register with said well or to be turned upwardly without uncovering said well, and electric connections for said heating plate operable in either position of said cover.

11. In an electric cooker, in combination, a casing having a well, a cover for said casing adapted to overlie said well, a heating plate carried by said cover adjacent to one side thereof and insulated to the other side, said cover being reversible so as to bring either the heating plate or insulated side adjacent said well, and electric connections for said heating plate carried by the edge of said plate and operable in either position thereof.

12. In an electric cooker, in combination, a casing having a well and a cover, an electric heating plate located adjacent the bottom of said well, a second electric heating plate carried by one face of said cover and insulated from the other face, said cover being reversible whereby said heating plate can be turned either toward or away from said well without leaving the latter unturned, and electric connections for each of said heating plates and accessible exteriorly of said casing.

13. In an electric cooker, in combination, a casing having a well and a cover, an electric heating plate located adjacent the bottom of said well, a second electric heating plate carried by one face of said cover and insulated from the other face, said cover being reversible whereby said heating plate can be turned either toward or away from said well without leaving the latter unturned, and electric connections for each of said heating plates and accessible exteriorly of said casing, the connections carried by said cover being located at the edge thereof so as to be accessible in either position of said cover.

14. In an electric cooker, in combination, a casing having a well therein and a cover therefor, and electric heating plate located adjacent the bottom of said well, a second electric heating plate located adjacent one face of said cover, the other face of said cover being insulated therefrom and said cover being reversible to bring either the insulated side or the heating plate adjacent to said well, electric terminals carried by said casing and connected to the first heating plate, other terminals carried by said cover and connected to the second heating plate, and a flexible electric connection having connectors secured to spaced points thereof adapted for engagement with said terminals either simultaneously or successively.

15. In an electric cooker, in combination, a casing having a well therein and a cover adapted to overlie said well, a heating plate carried by said cover adjacent one face thereof, the opposite face of the cover being insulated therefrom and said cover being reversible, a plurality of independent electric circuits carried by said plate, and a plurality of independent usable terminals carried by said cover and accessible in both positions thereof.

16. In an electric cooker, in combination, a casing having a well and a cover adapted to overlie the same, an electric heating element located adjacent the bottom of said well, terminals for said element carried by said casing and accessible exteriorly thereof, a second electric heating plate carried by said cover adjacent one face thereof and insulated to the other face, said cover being reversible so as to bring either the heating plate or the insulated face adjacent said well and said second heating plate having a plurality of electric circuits, electric terminals carried by said cover and independently connected to said circuits, and an electric conductor having a plurality of connectors carried thereby and adapted for connection to any two terminals simultaneously.

17. A cover for an electric cooker comprising a thin insulated slab having its opposite faces insulated one to the other, a heating element carried by said cover adjacent one face and insulated to the other face, said cover being reversible whereby either face may be brought adjacent to said well and electric connections for said heating element located at the edge of said cover.

In witness whereof, I hereunto subscribe my name this 26th day of January A. D., 1923.

JACOB L. MOORE.